(12) United States Patent
Morris, III et al.

(10) Patent No.: US 6,714,318 B1
(45) Date of Patent: Mar. 30, 2004

(54) DITHERING METHOD AND APPARATUS FOR MULTITONE PRINTERS

(75) Inventors: Charles H. Morris, III, Longmont, CO (US); Joan L. Mitchell, Longmont, CO (US); Chai W. Wu, Poughquag, NY (US); Gerhard R. Thompson, Wappingers Falls, NY (US); Charles P. Tresser, Mamaroneck, NY (US); Nenad Rijavec, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/412,645

(22) Filed: Oct. 5, 1999

(51) Int. Cl.$^7$ .................................................. H04N 1/40
(52) U.S. Cl. ........................ 358/1.9; 358/3.01; 358/3.13
(58) Field of Search ............................... 358/3.13, 3.14, 358/3.15, 3.16, 3.17, 3.18, 3.19, 3.21, 3.01, 1.9

(56) References Cited

U.S. PATENT DOCUMENTS

| 5,196,942 A | * | 3/1993 | Shiau ......................... 358/3.21 |
| 5,729,663 A | * | 3/1998 | Lin et al. .................... 358/3.01 |
| 5,917,951 A | * | 6/1999 | Thompson et al. ......... 382/237 |
| 6,025,930 A | * | 2/2000 | Thompson et al. .......... 358/1.9 |

* cited by examiner

Primary Examiner—Thomas D. Lee
(74) Attorney, Agent, or Firm—Whitham, Curtis & Christofferson, P.C.; William H. Steinberg (57) ABSTRACT

Digital halftoning techniques in printers which construct and utilize a mask in a dithering algorithm for a multitone printer are generalized by using a decision matrix in conjunction with a dithering matrix. For each pixel in the image, pixel grey value and a mask threshold value are obtained. Based on these values, a decision is made on the grey level to be printed at each pixel. For extensions to multiple component color images, each component is treated independently as if it were a grey scale image. The mask threshold values and sizes are likely to be tuned per component and therefore different.

28 Claims, 6 Drawing Sheets

DITHERING METHOD AND APPARATUS FOR MULTITONE PRINTERS

CROSS-REFERENCE TO RELATED APPLICATIONS

The invention described in this application is related in subject matter to U.S. patent application Ser. No. 08/909,535 filed on Aug. 12, 1997, by Gerhard Thompson, Charles Tresser and Chai Wah Wu for "Multicell Clustered Mask with Blue Noise Adjustments" and U.S. patent application Ser. No. 08/943,881 filed on Oct. 13, 1997, by Gerhard Thompson, Charles Tresser and Chai Wah Wu for "Clustered Aperiodic Mask", now U.S. Pat. No. 5,917,951, both of which are assigned to a common assignee with this application. The disclosures of application Ser. Nos. 08/909, 535 and U.S. Pat. No. 5,917,951 are incorporated herein by reference.

DESCRIPTION

BACKGROUND OF THE INVENTION

1. Field of the Invention

The present invention generally relates to halftoning techniques in printers and, more particularly, to a method and apparatus for halftoning which construct and utilize a mask in a dithering algorithm for a multitone printer.

2. Background Description

Most printers today can print in only a limited number of colors. Digital halftoning is a technique for printing a picture (or more generally displaying it on some two-dimensional medium) using small dots with a limited number of colors such that it appears to consist of many colors when viewed from a proper distance. For example, a picture of black and white dots can appear to display grey colors when viewed from some distance.

The fastest and most commonly used methods for digital halftoning are dithering algorithms which use threshold arrays, also called dither matrices or dither masks. Masks can be constructed to generate dispersed dots, which means in particular that black dots can only cluster if the grey level is dark enough to make it improbable or impossible to have all black dots isolated. As a consequence, they are not practical for most laser printers or xerographic printers, since these types of printers have problems printing isolated dots.

To achieve clustering, one can use a traditional threshold array constructed so that increasing the grey level corresponds to printing larger and larger clusters at a fixed periodicity. This method does not produce unpleasant artifacts. However, depending on the printer resolution and the periodicity chosen, either the number of grey levels that can be represented using such a method is too small or the clusters which are generated are too large. To correct these effects, one usually uses a multicell array, which includes several single-cluster threshold arrays. In a multicell array, several clusters are grown with the same spatial period as in the single-cluster array, but are not grown simultaneously with each other. This allows for additional intermediate grey levels. U.S. patent application Ser. No. 08/909,535 filed on Aug. 12, 1997, by Gerhard Thompson, Charles Tresser and Chai Wah Wu for "Multicell Clustered Mask with Blue Noise Adjustments" and U.S. patent application Ser. No. 08/943,881 filed on Oct. 13, 1997, by Gerhard Thompson, Charles Tresser and Chai Wah Wu for "Clustered Aperiodic Mask", now U.S. Pat. No. 5,917,951, are examples of multicell-type approaches to obtain masks with many grey levels.

Better quality is expected if instead of black and white, one can print dots with several grey intensities. Usually the number of grey levels available, including white and black, is a power of two. The power can then be understood as the number of bits containing the grey level, and one speaks of multibit printing. This restriction to a power of two is not necessary and we will use the term multitone in the general case. It is in fact convenient to consider simple black and white (one bit) as a special case of multitone for the rest of the discussion.

Once a mask is devised for halftoning grey scale pictures, prior art allows it to be used for color pictures. The individual color planes are halftoned using rotated periodic masks, in order to avoid moiré patterns, or other changes are made to aperiodic masks such as described for instance in U.S. Pat. No. 5,341,228 to K. J. Parker and T. Mitsa in the case of a blue noise mask.

Most of these techniques and others are reviewed in the book Digital Halftoning, MIT Press, Cambridge, Mass. (1987) by R. Ulichney, which is a general reference for digital halftoning.

Problems to be Solved

When printing a grey area which corresponds to one of the printable dot intensities, common sense would a priori suggest that the most reasonable way to do so is by printing dots with the given intensity. There are two issues associated with this approach. The first is that the resulting grey may be darker than the individual grey dot in cases where the printed dots are not perfectly square and overlap. This however can be corrected by calibration. The other problem is that if the printer is a laser printer, or uses some other technology which cannot consistently control the intensity of each dot, some unpleasant patterning may be generated when trying to print large patches of intermediate grey levels. Several proprietary methods have been proposed to solve this problem which work reasonably well with some printers.

SUMMARY OF THE INVENTION

It is therefore an object of the present invention to provide a technique which allows one to solve the above problems so that enough parameters are available to adjust so as to adapt the method to any multitone printer, and any cell size.

According to the invention, a method and apparatus are provided for the halftoning of grey scale (or components of color) images using a multitone printer. Digital halftoning techniques in printers which construct and utilize a mask in a dithering algorithm for a multitone printer are generalized by using a decision matrix in conjunction with the dithering matrix. In the practice of the method, a pixel grey value and a mask threshold value are obtained for each pixel in the image. Based on these values, a decision is made on the grey level to be printed at each pixel. The apparatus for halftoning of a grey scale image using a multitone printer according to the invention comprises an image storage for storing an image and means, such as a scanner, for inputting an image in the image storage. A dither matrix stores mask threshold values. A pixel grey value and a mask threshold value for each pixel in an image stored in said image storage are obtained, and a decision on the grey level to be printed at each pixel depending on the input grey value and the mask threshold value. For extensions to multiple component color images, each component is treated independently as if it were a grey scale image. The mask threshold values and sizes are, in that case, likely to be tuned per component and therefore different.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

To better understand the invention, we first review black and white dithering. The input image is scanned by a scanner and stored in image storage as the matrix representation $I=\{P_{u,v}\}$ of the image, where (u,v) is the pixel location. A dither matrix array is used to halftone the image in storage.

If L+1 is the number of grey levels to be represented, any m×n matrix $M=\{T_{ij}\}$ we consider in this description is an array of numbers between 0 and L. These numbers represent threshold levels. Any dithering algorithm in black and white works as follows. Using a dither matrix $M=\{T_{ij}\}$, the pixel at location (u,v) will get printed as a black dot if and only if $T_{u',v'}$, where u'=u mod m and v'=v mod n, is smaller than the grey level $P_{u,v}$ on the image to be printed at location (u,v). This is determined in a comparator, the output of which is sent to the printer. As usual in number theory, c mod d stands for the remainder of the division of c by d.

From the geometric point of view, the dither matrix M will be an m×n rectangular array where m and n are the number of rows and columns respectively in the array. Its construction is usually implemented by assuming periodic boundary conditions so that the array can be thought of as being a two dimensional torus. We will also use the symbol M to designate the array given in the form of a matrix, and it should be clear whether we mean the rectangle or the matrix.

The dithering process for black and white printers, as we just described it, is completely determined by M. Associated with this process is a decision matrix $D=\{d_{P,T}\}$, where P and T vary between 0 and L defined by $d_{P,T}=1$ if $P \geq T$, $d_{P,T}=0$ otherwise.

Given an input P and a threshold level T at location (u,v), a black dot will be printed at (u,v) if and only if $d_{P,T}=1$. Clearly, in black and white printing, the matrix D is implicitly defined once one has a mask, i.e., M completely determines D and using D is superfluous.

The convention adopted here is that the threshold values specify when the dot to be printed is black. Alternate conventions could be used such as the input value P must be greater than the threshold value T, in which case the threshold matrix specifies the last value for which the output remains "white".

The way we propose to generalize dithering to multitone printers is to use a matrix D in conjunction with the mask M, where now the entries of the matrix D are all the possible grey tones printable at individual dots. As before, the column index of matrix D is any possible threshold values in the mask M and the row index of the matrix D is any possible input grey levels. The main property of a general matrix D is that the average of the entries along a column are equal (or almost equal) to the corresponding input grey level. (This assumes that the threshold values in the mask M are uniformly distributed from 1 to the maximum threshold value. This is normally the case.) Given an input P at location (u,v) and a threshold level T, a dot with grey level $d_{P,T}=g$ will be printed at (u,v). For printers with complete control of the output at each dot, a preferred embodiment gives g which is either k or k+1 for each T when the input P is strictly between k and k+1 and will be k for each T when the input P=k. As we already mentioned such a matrix D gives unpleasant results when dealing with most laser printers so other structures of the matrix D will then be chosen for halftoning on laser printers. Typically, because toner deposition is more predictable close to high intensity electric fields, one then chooses to work with a clustered multicell matrix or mask M with black pixels at the centers of the cells by setting $d_{P,T}=1$ whenever P is large enough or significantly larger than T. Smaller values of $d_{P,T}$ can be chosen otherwise. In particular, to get the property that black dots are surrounded by lighter tone dots, one can make $d_{P,T}$ a decreasing function of T for any P, although in full generality, this monotonicity property is not required.

The process we describe here, using the conjunction of the matrices M and D in the dithering process, can be further generalized by defining $d_{P,T}$ as a probability vector $(P_0, P_1, \ldots, P_L)$, where, by definition of a probability vector, each $P_i \geq 0$ and $P_0 + P_1 + \ldots + P_L = 1$. Then, given P and T at location (u,v), the tone printed at location (u,v) will be k with probability $P_k$. Note that $P_k=0$ for all k which do not correspond to the grey value of a dot which can be printed.

One feature of the method according to the invention is that the dot printed at each pixel does not depend on neighboring input pixels. It belongs to the class of point algorithms. This is in contrast to neighborhood algorithms such as error diffusion which require the neighboring input pixels to determine the multitone dot to be printed.

In general, point algorithms are faster and require less data storage than neighborhood algorithms.

For simplicity of description, the subject invention is described in terms of grey scale images. Each pixel therefore has a single value. For color images prepared to be printed, each pixel may be composed of three, or more, typically four, components; e.g., cyan (C), magenta (M), yellow (Y), and sometimes black (K). Each component of these CMY or CMYK images may be treated as a "grey scale" image of that component. This extension from the grey scale images into multiple component color images is straightforward to those skilled in the art and requires no further explanation. When printing a binary representation of each component of a color image, the threshold matrices are tuned for each color component. Similarly, the matrices in this invention may be tuned for each component. Thus, the sizes of the threshold matrices (m and n) and the values $T_y$ contained in them may be different for each color component. In addition, a current convention is to use the value of 0 to represent white and the value 255 to represent full black (or full tone if color halftoning), but those skilled in the art will understand that the opposite convention may be adopted and that different values may be used.

Figure 1:
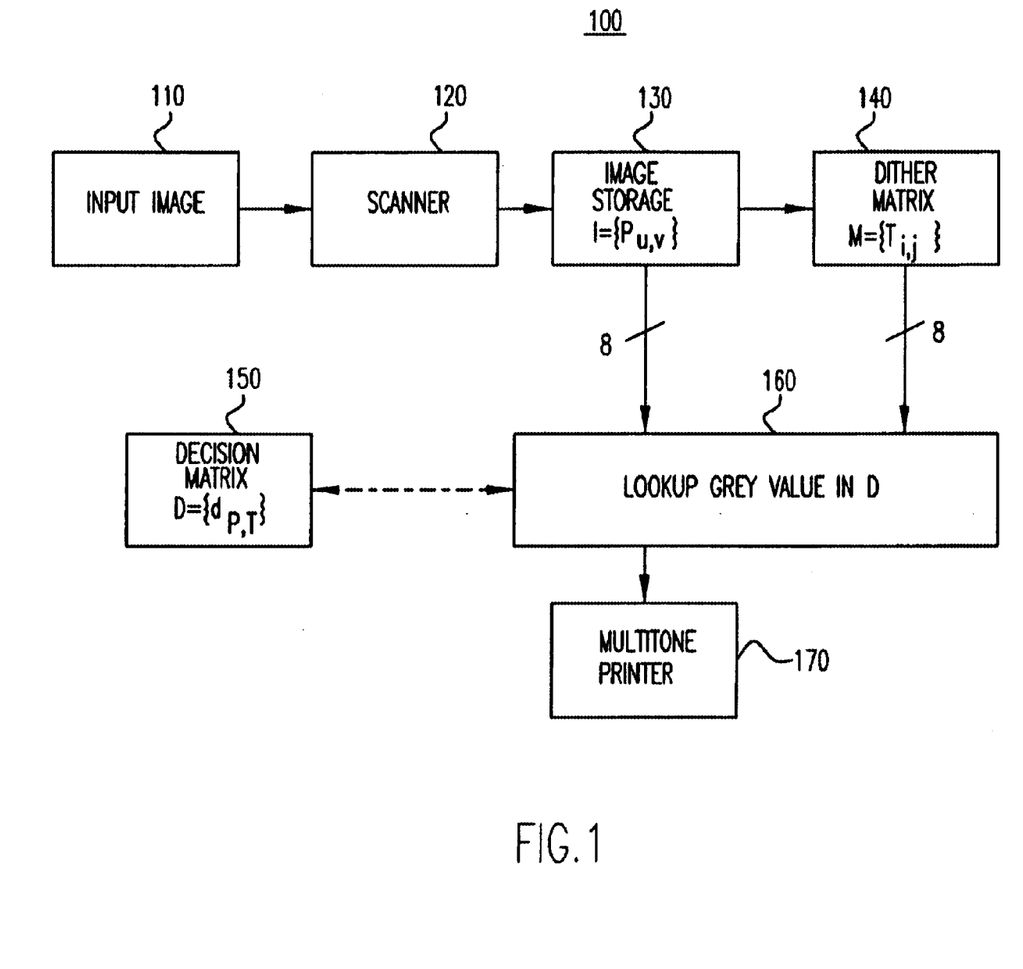
FIG. 1 is a block diagram of a halftoning system showing the preferred embodiment of the general invention using a lookup table.

Referring now to the drawings, and more particularly to FIG. 1, there is shown in block diagram form the data flow from the input image to the printer. More specifically, the input image 110 is scanned by a scanner 120 and stored in image storage 130 as image I={$P_{u,v}$} where P is the pixel value and (u,v) is the pixel location. A dither matrix array 140 contains an m×n rectangular array of threshold values $T_{ij}$ where i=u mod m and j=v mod n.

Using the dither matrix M={$T_{ij}$} (block 140), and a decision matrix D={$d_{P,T}$} (block 150), the pixel $P_{u,v}$ at location (u,v) with grey value P in image storage 130 will get printed as a dot of grey level $d_{P,T}$, where T=$T_{u',v'}$ and u'=u mod m and v'=v mod n. This operation is performed by the lookup apparatus 160, the output of which is sent to the multitone printer 170. In FIGS. 1 to 4, bit lines are shown as 8-bit lines or 9-bit lines but can be different depending on applications.

Figure 2:
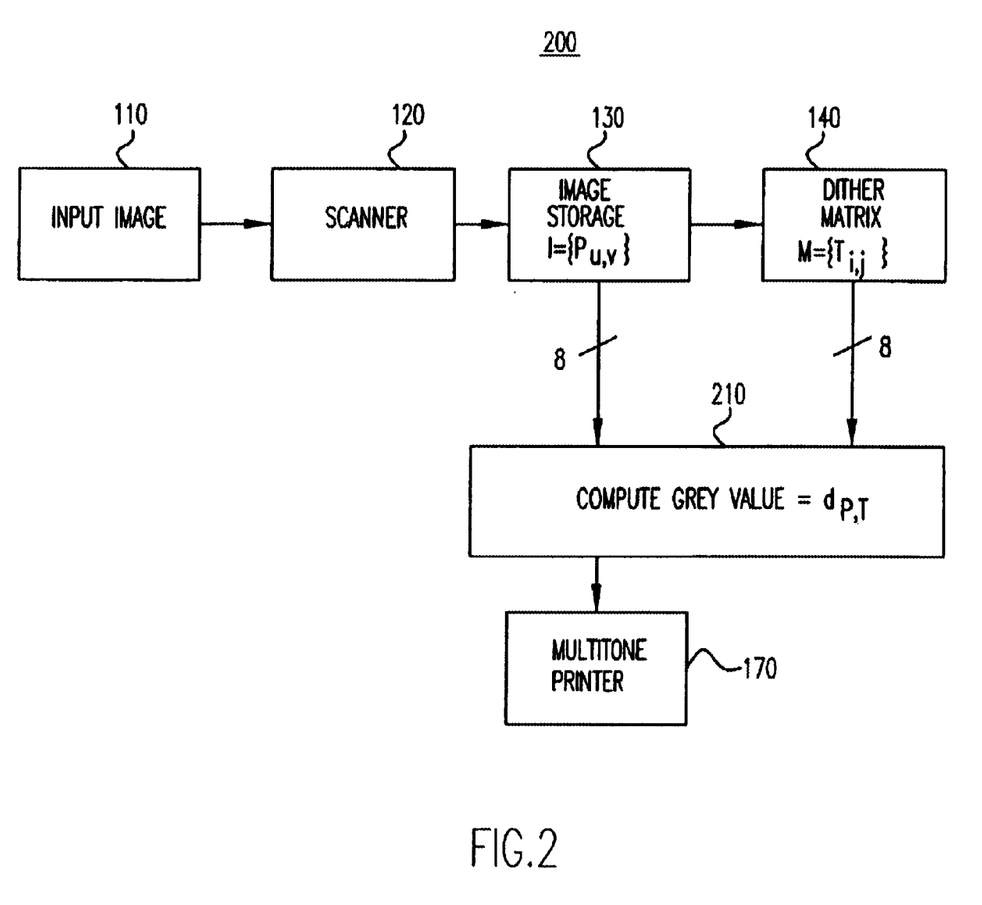
FIG. 2 is a block diagram of a halftoning system showing the preferred embodiment of the general invention using a computation of the output.

Note that the matrix D is used as a lookup table. If the decision matrix D is endowed with some special structure or is defined by some simple algorithmic procedure, then instead of looking up $d_{P,T}$ in the matrix D, $dP,T$ can be calculated directly by some algorithm as shown in FIG. 2. The decision matrix 150 and lookup table 160 have been replaced with a block 210 to compute the grey value. The output is then sent to the multitone printer 170.

Figure 3:
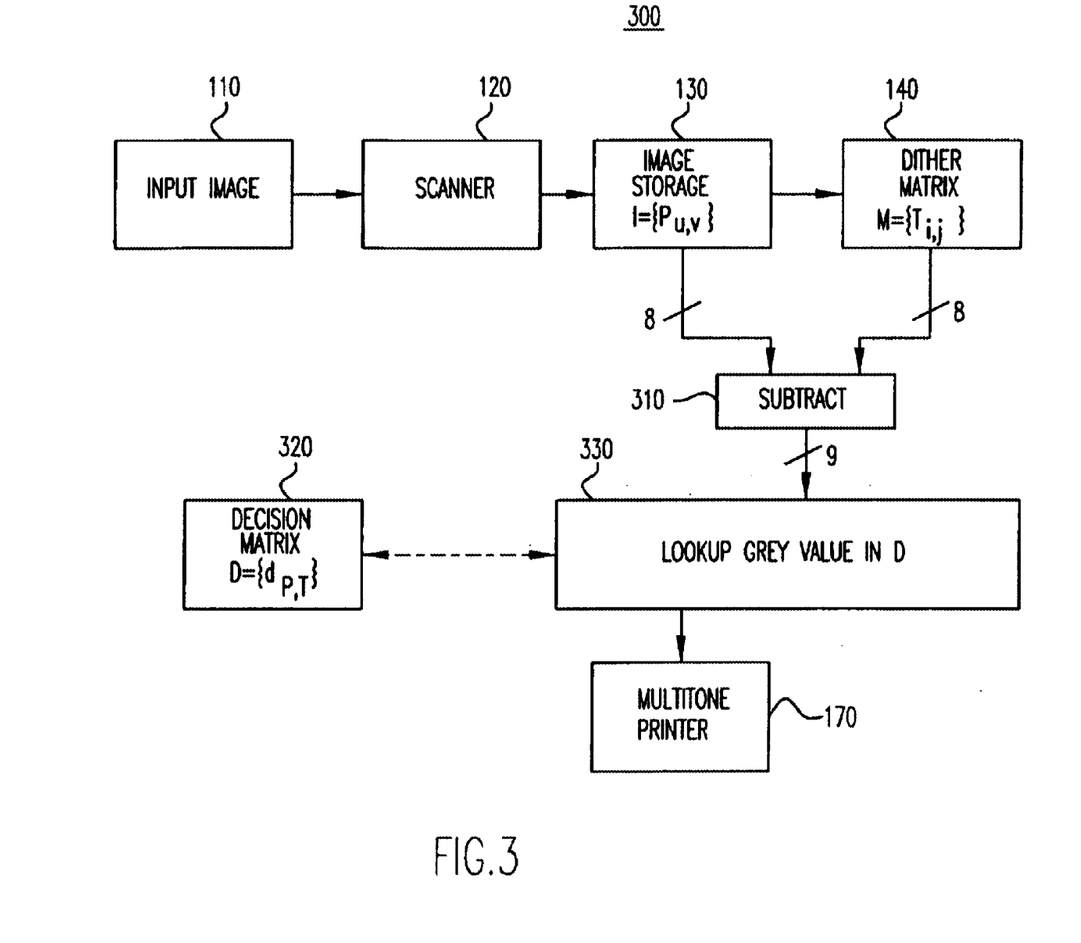
FIG. 3 is a block diagram of a halftoning system showing the preferred embodiment with a smaller lookup table based on the difference of the input value and the threshold value.

FIG. 3 shows a preferred embodiment with a much smaller lookup table 320. Function $d_{P,T}$ is defined as the following lines of pseudocode:

$d_{P,T}$=1 if P>T+$\Delta_1$ $d_{P,T}$=0 if P<T-$\Delta_0$ $d_{P,T}$=f(T-P) otherwise where f is a function of T-P which outputs a multitone grey depending on the difference between T and P. The pixel value P is subtracted from the threshold value T (block 310) before being input into block 330. The decision matrix is now a function of T-P. The results of the lookup are output to the multitone printer.

Figure 4:
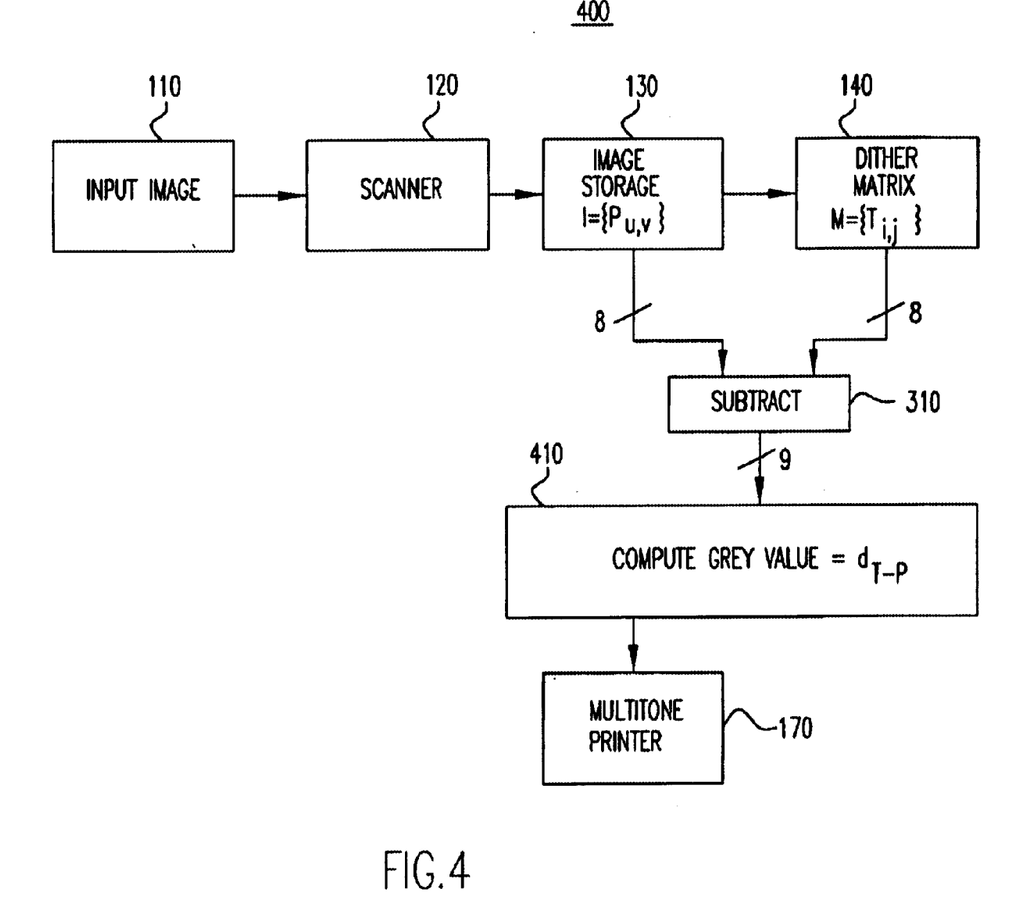
FIG. 4 is a block diagram of a halftoning system showing the preferred embodiment computing the output based on the difference of the input value and the threshold value.

Instead of first constructing the matrix D and then using the matrix D as a lookup table, the value of $D_{P,T}$ can be obtained by implementing the above three lines of pseudocode directly in the halftoning method as shown in FIG. 4. In block 410 the difference is used to compute the grey value. Again the output is sent to the multitone printer 170.

Figure 5:
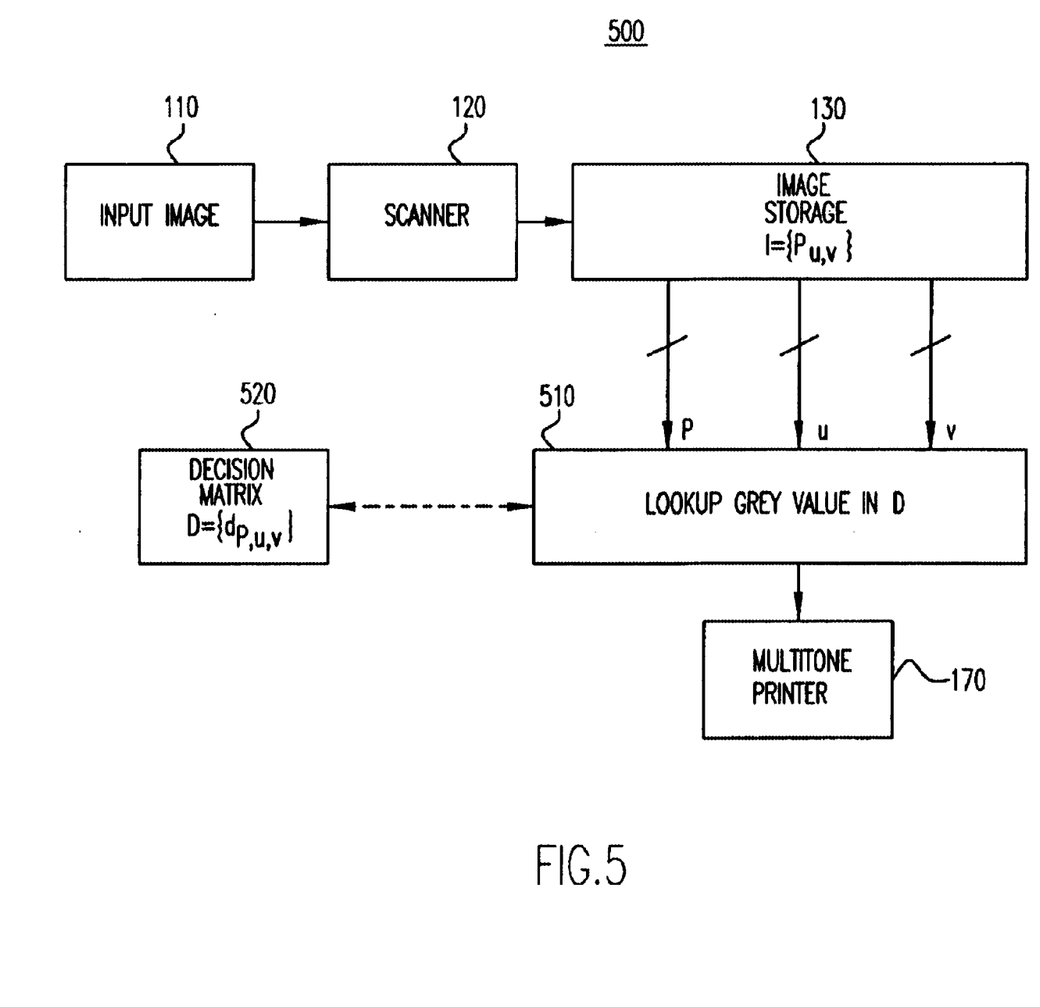
FIG. 5 is a block diagram of a halftoning system showing a preferred embodiment using only one look up table which is indexed by the input pixel value and the pixel location.

In another preferred embodiment, the array D is indexed by the input pixel value P=$P_{u,v}$ and the location of the pixel described by the indices u and v', i.e., D has entries $D_{P,u,v}$. The mask or dither matrix M is not needed as shown in FIG. 5. The pixel value P=$P_{u,v}$ and the location u and v are sent from the image storage 130 to block 510 which looks up output grey level $D_{P,u,v}$ from the decision matrix D 520. D is then sent to multitone printer 170 to be printed.

Figure 6:
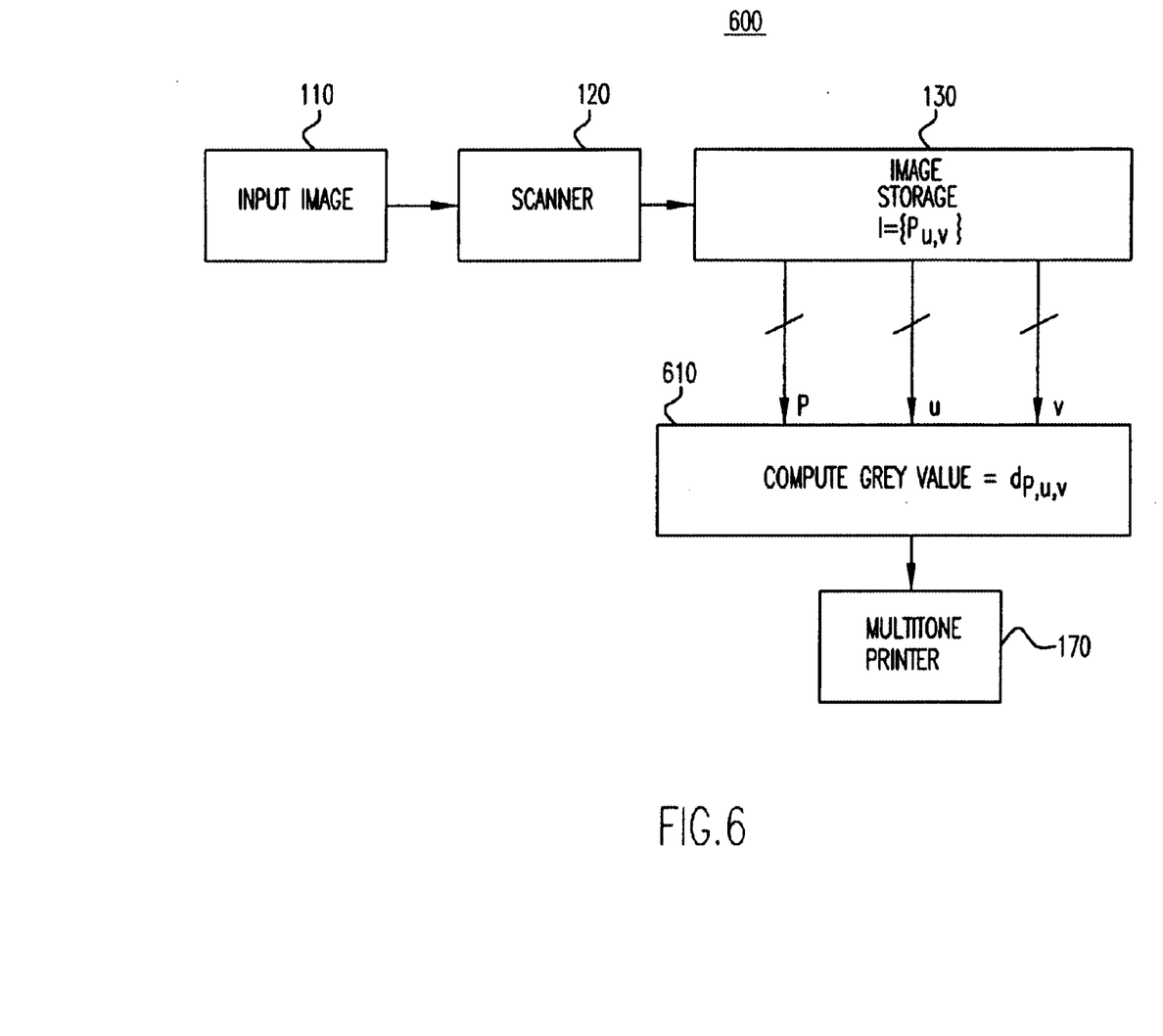
FIG. 6 is a block diagram of a halftoning system showing a preferred embodiment computing the output based on the input pixel value and the pixel location.

Instead of first constructing D and then using D as a lookup table, the value of $D_{P,u,v}$ can also be obtained by implementing an algorithm to compute $D_{P,u,v}$ as shown in FIG. 6. In block 610, the grey level $D_{P,u,v}$ is computed from P,u and v and subsequently sent to the multitone printer 170. In both implementations in FIGS. 5 and 6, instead of using locations u and v to determine the output grey level, the numbers u'=u mod m and v'=v mod n can be used.

The array D can also be dependent on the location of the pixel as described by the indices u and v. This can be implemented by using multiple arrays D, and the appropriate array D is chosen depending on u and v, or the array D has entries $D_{P,T,u,v}$ which also depends on u and on v.

Again, for simplicity of description, the subject invention has been described in terms of grey scale images, but those skilled in the art will understand that extension to color printing is straightforward. Specifically, each component of the color images may be treated as a "grey scale" image of that component. When printing a binary representation of each component of a color image, the threshold matrices are tuned for each color component. Similarly, the matrices in this invention may be tuned for each component.

While the invention has been described in terms of several preferred embodiments, those skilled in the art will recognize that the invention can be practiced with modification within the spirit and scope of the appended claims.

What is claimed is:

1. A method for halftoning of a grey scale image using a multitone printer comprising the steps of:

for each pixel in the image, obtaining an input pixel grey value and a mask threshold value; and deciding on the grey level to be printed at each pixel location according to a decision array, said decision array containing an entry for each pair formed by the input grey value and the mask threshold value.

2. The method of halftoning of a grey scale image recited in claim 1, wherein the entries of the decision matrix are chosen so that nothing or full tone is printed if the input and mask values differ by more than some given or computed value, and grey tones arc printed otherwise.

3. The method of halftoning of grey scale images recited in claim 1, wherein the entries of the decision matrix are chosen so that for any pixel grey value, all entries with said pixel grey value as index are one of two different grey values not equal to said pixel grey value, at least one of the two entries used to render a pixel grey value represents neither nothing printed nor full tone, except for the case that nothing printed or full black is the desired rendition for said pixel, in which case all the entries with said pixel grey value as index represent nothing printed or fully tone respectively.

4. The method of halftoning of grey scale images recited in claim 1, wherein the entries of the decision matrix are probability vectors whose entries are used to determine probabilistically the grey level tone to be printed at each pixel.

5. A method for the halftoning of a grey scale image using a multitone printer recited in claim 1, where said decision array is obtained by computing the value of a decision function which depends on both the input grey value and the mask threshold value.

6. The method of halftoning of grey scale images recited in claim 5 wherein the value of a decision function is computed so that nothing or full tone is printed if the input and mask values differ by more than some given or computed value, and grey tones are printed otherwise.

7. The method of halftoning of grey scale images recited in claim 5 wherein the value of a decision function is computed so that for any pixel grey value, all entries with said pixel grey value as index are one of two different grey values not equal to said pixel grey value, at least one of the two entries used to render a pixel grey value does not represent nothing printed nor full tone, except for the case that noting printed or full tone is the desired rendition for said pixel in which case all the entries with said pixel grey value as index represent nothing printed or full black respectively.

8. The method of halftoning recited in claim 5, where said function value is 1 if the input value is larger than the threshold value by more than a first value $\Delta_1$, said function value is 0 if the threshold value is larger than the input value by more than a second value $\Delta_0$, and said function value is a grey tone that is a function of the difference between the input grey level and the threshold value otherwise.

9. A method for the halftoning of a grey scale image using a multitone printer recited in claim 1, further comprising the step of printing a dot with said grey level to be printed.

10. The method of halftoning of a grey scale image recited in claim 1, used to halftone each component of a color image.

11. The method of halftoning of a grey scale image recited in claim 1, used in a black and white printer.

12. An apparatus for halftoning of a grey scale image using a multitone printer comprising:

an image storage for storing an image;

means for inputting an image in said image storage;

a dither matrix storing mask threshold values;

means for obtaining an input pixel grey value and a mask threshold value for each pixel in an image stored in said image storage; and means for deciding on the grey level to be printed at each pixel location according to a decision array, said decision array containing an entry for each pair formed by the input grey value and the mask threshold value.

13. The apparatus for halftoning of a grey scale image recited in claim 12, wherein the means for deciding further comprises:

lookup means for accessing the decision array and determining whether a pixel in the image storage is printed as a dot of a given grey level.

14. The apparatus for halftoning of a grey scale image recited in claim 12, wherein each entry in said decision array is obtained by computing a value of a decision function which depends on both the input grey value and the mask value.

15. The apparatus for halftoning of a grey scale image recited in claim 12, wherein the means for deciding comprises:

means for subtracting a pixel value from the threshold value; wherein said decision array contains entries which are a function of difference values of pixel values and threshold values; and lookup means for accessing the decision array and determining whether a pixel in the image storage is printed as a dot of a given grey level.

16. The apparatus for halftoning of a grey scale image recited in claim 12, wherein the means for deciding further comprises:

means for subtracting a pixel value from the threshold value; and means for computing as entries is said decision array a value of a decision function which depends on difference values of pixel values and threshold values.

17. The apparatus for halftoning of a grey scale image recited in claim 12, further comprising a multitone printer responsive to said means for deciding for printing a dot of a decided grey level.

18. The apparatus for halftoning of a grey scale image recited in claim 17, wherein the multitone printer is a color printer in which each component of a color image is treated independently as a grey scale image.

19. A method for halftoning of a grey scale image using a multitone printer comprising the steps of:

for each pixel in the image, obtaining a pixel grey value and pixel location values; and deciding on the grey level to be printed at each pixel location according to a decision array, said decision array containing an entry for each index set formed by the pixel grey value and the pixel location values.

20. The method for halftoning a grey scale image using a multitone printer recited in claim 19, wherein said decision array is obtained by computing a value of a decision function which depends on both the pixel grey value and the pixel location values.

21. The method for halftoning a grey scale image using a multitone printer recited in claim 19, further comprising the step of printing a dot with said grey level to be printed.

22. The method for halftoning a grey scale image using a multitone printer recited in claim 19, used to halftone a color image.

23. The method for halftoning a grey scale image using a multitone printer recited in claim 19, used in a black and white printer.

24. An apparatus for halftoning of a grey scale image using a multitone printer comprising:

means for obtaining a pixel grey value and pixel location values for each pixel in the image; and means for deciding on the grey level to be printed at each pixel location according to a decision array, said decision array containing an entry for each index set formed by the pixel grey value and the pixel location values.

25. The apparatus for halftoning a grey scale image using a multitone printer recited in claim 24, wherein said means for deciding obtains entries in said decision array by computing a value of a decision function which depends on both the pixel grey value and the pixel location values.

26. The apparatus for halftoning a grey scale image using a multitone printer recited in claim 24, further comprising a printer for printing a dot with said grey level to be printed.

27. The apparatus for halftoning a grey scale image using a multitone printer recited in claim 24, used to halftone a color image.

28. The method for halftoning a grey scale image using a multitone printer recited in claim 24, used in a black and white printer.

* * * * *